United States Patent [19]

Soules et al.

[11] 4,079,287

[45] Mar. 14, 1978

[54] FLUORESCENT LAMP CONSTRUCTION UTILIZING A MIXTURE OF TWO PHOSPHOR MATERIALS

[75] Inventors: Thomas F. Soules, Cleveland Heights; Thomas E. Offerle, Euclid, both of Ohio

[73] Assignee: General Electric Company, Schenectady, N.Y.

[21] Appl. No.: 763,442

[22] Filed: Jan. 28, 1977

Related U.S. Application Data

[63] Continuation-in-part of Ser. No. 616,596, Sep. 25, 1975, abandoned.

[51] Int. Cl.² .......................... H01J 1/63; H01J 63/04
[52] U.S. Cl. .............................. 313/487; 252/301.4 P
[58] Field of Search .............................. 313/485–487; 252/301.4 R, 301.4 P

[56] References Cited

U.S. PATENT DOCUMENTS

| 3,602,757 | 8/1971 | Wachtel | 313/487 |
| 3,602,758 | 8/1971 | Thornton et al. | 313/487 |
| 3,670,194 | 6/1972 | Thornton et al. | 313/487 |
| 3,832,591 | 8/1974 | Larson | 313/486 X |
| 3,858,082 | 12/1974 | Thornton | 313/487 |
| 3,875,453 | 4/1975 | Thornton | 313/487 |

Primary Examiner—Gerard R. Strecker
Attorney, Agent, or Firm—John F. McDevitt; Lawrence R. Kempton; Frank L. Neuhauser

[57] ABSTRACT

A fluorescent lamp construction is described utilizing a particular combination of two different phosphor materials in order to produce an efficient composite emission. The particular phosphor combination can be utilized as a blended mixture in order to provide efficient white light with color rendition comparable to deluxe-type fluorescent lamps.

6 Claims, 4 Drawing Figures

FLUORESCENT LAMP CONSTRUCTION UTILIZING A MIXTURE OF TWO PHOSPHOR MATERIALS

This application is a continuation-in-part of Ser. No. 616,596, filed Sept. 25, 1975, and now abandoned.

BACKGROUND OF THE INVENTION

This invention relates generally to a low-pressure mercury vapor discharge lamp having a particular type phosphor coating to emit white light when excited by the ultraviolet radiation generated from the mercury vapor discharge. More particularly, the present type lamp construction is intended for general illumination at a color temperature in the range 2,700° –6,500° K with a satisfactory color rendition and at higher emission efficiency than conventional deluxe-type fluorescent lamps.

The use of several luminescent materials in combination to produce a predetermined overall spectral energy distribution is well-known. It is also well-known to employ such material combinations as a blended mixture or as a plurality of two or more layers in which one layer generally further comprises a blend of the individual phosphors. Particularly well-known phosphor blends in the form of a single layer phosphor coating to produce white color emission include two component mixtures for deluxe cool-white and deluxe warm-white. These already well-known two component phosphor mixtures generally employ a manganese-activated or antimony-activated strontium haloapatite phosphor constituent including various combinations thereof. Conventional deluxe-type fluorescent lamps represent a compromise between luminous efficiency (lumen output per watt input) and color rendition since better color rendition is usually achieved with a reduction of as much as 35 percent or more in luminous efficiency. A satisfactory color rendition for deluxe-type fluorescent lamps is approximately 80 or more as measured by the generally accepted C.I.E. color rendering index. The color temperature of the emission in these lamps is also fixed at around 3,000° K for the warm-white deluxe lamp, around 3,500° K for the standard white deluxe lamp, around 4,200° K for the cool-white deluxe lamp, and around 6,500° K for the daylight deluxe lamp, as measured by the C.I.E. chromaticity $x$ and $y$ values.

A relatively recent fluorescent lamp development employs various rare earth oxide phosphors exhibiting higher luminous efficiency than the conventional phosphors to increase the overall efficiency of the phosphor combination. A rare earth oxide phosphor being employed in this manner is generally blended with two or more different phosphor materials to provide efficient composite emission. In a different known embodiment, the relatively expensive rare earth oxide phosphor material is employed as a separate top layer overlying a phosphor blend layer of less expensive phosphors to increase the absorption of ultraviolet radiation by the expensive material and thereby increase the composite emission. Such a combination permits accomplishment of a predetermined spectral energy distribution utilizing less rare earth oxide phosphor material than would be the case if a single phosphor layer of the blended mixture were employed.

SUMMARY OF THE INVENTION

The present invention provides a particular combination of two different phosphor materials to achieve improved luminous efficiency at comparable color rendition in a deluxe-type fluorescent lamp. More particularly, it has been found that a combination of a strontiumhaloapatite phosphor with europium-activated yttrium oxide phosphor produces the desired emission at a color temperature range from about 2,700K to about 6,500K with both a satisfactory color rendition and higher luminous efficiency than can be obtained with conventional phosphor blends. The particular strontiumhaloapatite phosphors which can be used in this manner are already well-known and the general class of such phosphor materials is described in U.S. Pat. No. 2,488,733 to McKeag and Ranby. The useful strontium-haloapatite phosphors comprise strontium blue halophosphate phosphor utilizing antimony activated, strontium green halophosphate phosphor coactivated with antimony and manganese, and strontium yellow halophosphate phosphor which contains a still greater manganese activator level. The useful class of these phosphor materials can be represented by the following formula:

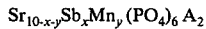

$$Sr_{10-x-y}Sb_xMn_y(PO_4)_6 A_2$$

wherein A is a halide ion selected from F and Cl including combinations thereof, $x$ can be in the range from approximately 0.04–0.15 and $y$ can range from approximately 0.01–0.42. A typical phosphor material can be prepared in conventional fashion by firing a mixture of $SrH\,PO_4$, $SrCO_3$, $SrF_2$, $MnCO_3$, and $Sb_2O_3$ from 4 to 6 hours at 1,100° C.

Useful europium-activated yttrium oxide phosphors in the practice of the present invention are also well-known as disclosed in the U.S. Pat. No. 3,301,791 to Brixner. As will be further described in connection with the following preferred embodiments, the selection of particular phosphor material constituents and the proportion of these phosphor constituents in a blended mixture is accomplished in a specific manner from the predetermined visible spectral energy distribution desired as measured by the C.I.E. chromaticity values.

The relative proportions of the individual phosphor constituents in a blended mixture of the present phosphor combination are maintained at weight ratios having approximately 68–85 weight percent of the strontium haloapatite phosphor and approximately 32–15 weight percent of the europium-activated yttrium oxide phosphor. As will also be further described hereinafter in connection with the preferred embodiments, a blended phosphor mixture containing said phosphor combination at the specified weight ratios and which further includes a third phosphor constituent exhibiting a visible emission response comparable to the composite visible emission response of said phosphor combination produces the same desired results at lower phosphor costs. Such ternary phosphor mixture utilizes a lesser weight proportion of the relatively expensive europium-activated yttrium oxide phosphor constituent without appreciably sacrificing luminous efficiency compared with a binary mixture utilizing only said phosphor combination. The particular class of phosphors which can be admixed with the present phosphor combination in this manner is selected from conventional calcium halophosphate phosphors exhibiting an emission response satisfying the chromaticity $x$ and $y$ values for deluxe-type fluorescent lamps. A useful phosphor in a cool-white deluxe lamp can have the batch formula:

$$Ca_{8.69}Sb_{.185}Mn_{.18}Cd_{.0972}(PO_4)_6(CaF_2)_{.89}Cl_{.378}$$

A useful phosphor in a standard white lamp can have the batch formula:

$$Ca_{8.65}Sb_{.185}Mn_{.252}Cd_{.0972}(PO_4)_6(CAF_2)_{.882}Cl_{.379}$$

A useful phosphor in a warm-white deluxe lamp can have the batch formula:

$$Ca_{8.59}Sb_{.196}Mn_{.342}Cd_{.0972}(PO_4)_6(CaF_2)_{.864}Cl_{.438}$$

A typical phosphor admixture which can be used in a daylight deluxe lamp contains approximately 51 percent by weight of the above defined phosphor for use in a standard white deluxe lamp with approximately 49 percent by weight of a blue halophosphate phosphor having the batch formula:

$$Ca_{8.81}Sb_{.082}Cd_{.0972}(PO_4)_6(CaF_2)_{.95}$$

Illustrative examples for a ternary admixture utilizing various proportions of the particular phosphor additive above identified for use in a standard white deluxe lamp are hereinafter provided in the description of the preferred embodiments.

BRIEF DESCRIPTION OF THE DRAWINGS

Embodiments of the invention will now be described with references to the accompanying drawings in which.

DESCRIPTION OF THE PREFERRED EMBODIMENTS

The particular phosphor combination herein employed utilizes one phosphor constituent emitting relatively broad band emissions in the lower spectral region from approximately 4,500 to 5,900 Angstroms along with a specific rare earth oxide phosphor constituent exhibiting narrow band emission in the spectral energy region from approximately 6,000 to about 6,150 Angstroms for higher emission efficiency and satisfactory color rendition at the desired color temperature. By varying the weight ratio of these phosphor constituents in the blended mixture as hereinafter described in greater detail, it becomes possible to achieve the same approximate color temperature that is emitted by conventional deluxe-type fluorescent lamps. The improvement in composite emission results from the relatively higher emission efficiency of the rare earth oxide phosphor compared with that for the tin-activated orthophosphate phosphor now used in said conventional lamps and the present phosphor combination has also been found to provide this benefit with no appreciable decrease in lamp maintenance.

Figure 1:
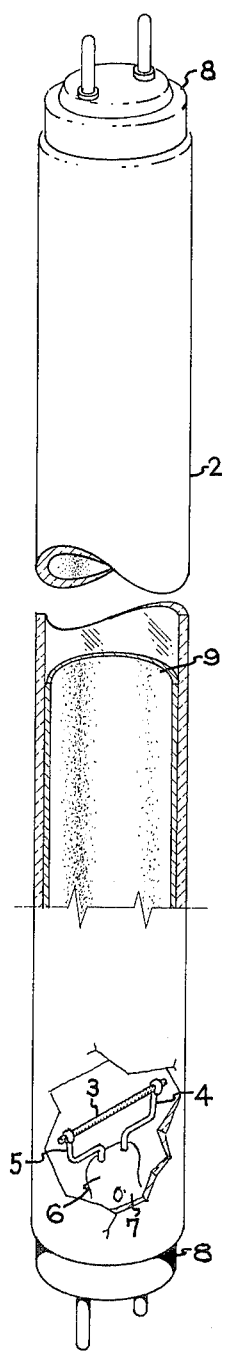
FIG. 1 is a perspective view partially broken away of a fluorescent lamp construction in accordance with the present invention.

Referring to FIG. 1, there is shown a fluorescent lamp 1 comprising an elongated soda-lime silicate glass bulb 2 with a circular cross section. The discharge assembly in said lamp has the usual electrode structure 3 at each end supported by in-lead wires 4 and 5 which extend through a glass press seal 6 in a mount stem 7 to the contacts of a base 8 affixed at opposite ends of the lamp. The discharge-sustaining filling in the sealed glass tube is an inert gas such as argon or a mixture of argon and other gases at a low pressure in combination with a small quantity of mercury to provide the low vapor pressure manner of lamp operation. The inner surface of the glass bulb is provided with a phosphor coating 9 which is applied extending substantially the full length of the bulb and around the bulb circumferential inner wall.

To better illustrate the improvement obtained in emission behavior for the above type lamp construction utilizing the present phosphor combination as a blended mixture, various 40-WT12 lamps were constructed for comparison with conventional deluxe-type fluorescent lamps now utilizing strontium blue halophosphate or strontium green halophosphate with tin-activated strontium orthophosphate in approximately equal weight proportions. The conventional deluxe white lamps exhibited approximately 2,100 lumens value at 100 hours with a color temperature within the color oval shown in FIG. 3 while the present phosphor combination utilizing an approximate 80 parts strontium green halophosphate with 20 parts europium-activated yttrium oxide in the blended mixture achieved 2,750 lumens output at approximately the same color temperature. The present lamps further exhibited a 5-8 percent lumen depreciation after 1,000 hours of burning which is comparable to the maintenance performance of the conventional deluxe-type fluorescent lamps tested.

Figure 2:
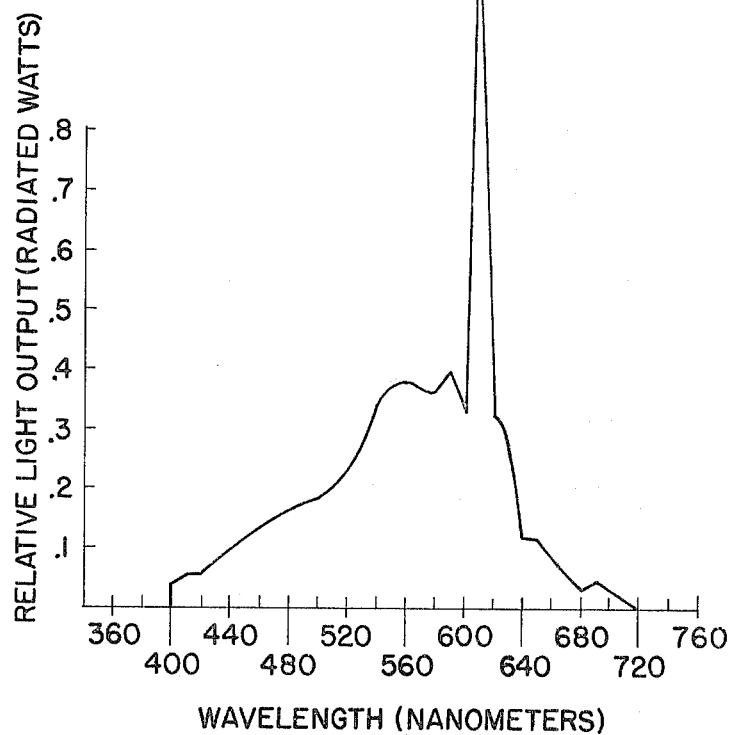
FIG. 2 is a visible emission curve for a blended phosphor mixture in accordance with the present invention.

The particular emission spectrum for the above illustrated lamp construction of the present invention is shown in FIG. 2. It can be noted from said visible emission curve that broad band emission over the spectral region extending from approximately 4,500 to 5,900 Angstroms wave length is attributable to the proportion of strontium green halophosphate phosphor in the blended mixture having a chemical composition which can be represented by the structural formula:

$$Sr_{8.71}Sb_{.052}Mn_{.17}(PO_4)_6 \cdot .93\ SrF_2$$

The portion of said emission curve extending from approximately 5,800 to 6,200 Angstroms wave length is attributable to the proportion of rare earth oxide phosphor in the blended mixture, said phosphor having a chemical composition which can also be represented by the structural formula: $Eu^{3+}:Y_2O_3$. A color-rendering index value of 82 was obtained for said lamp construction as measured by the generally accepted C.I.E. method. The $x$ and $y$ chromaticity values for said lamp construction in accordance with a further well-known C.I.E. method were found to be $x = 0.404$ and $y = 0.395$. Said chromaticity values lie within the same color oval shown in FIG. 3 for conventional deluxe white lamps.

Figure 3:
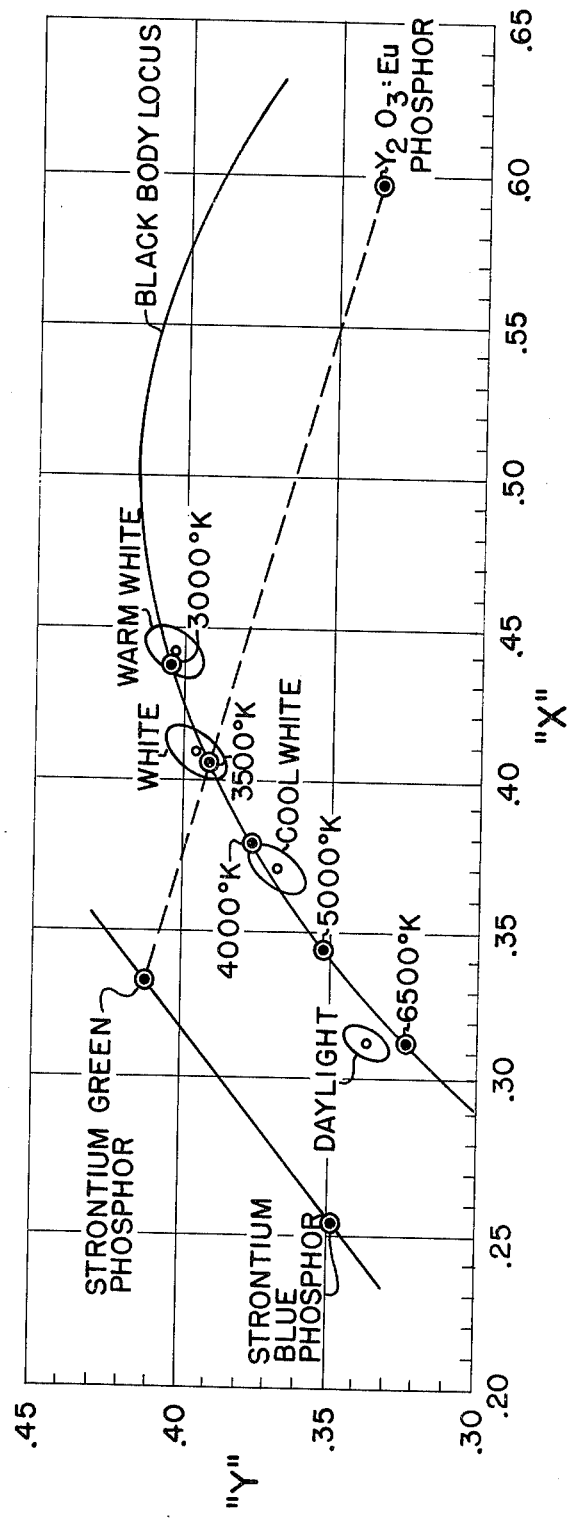
FIG. 3 is a C.I.E. chromaticity diagram including the black body locus line with corresponding color temperatures indicated thereon for various deluxe-type fluorescent lamps.

Comparable results are obtained with a different phosphor combination in accordance with the present invention to provide a warm-white deluxe color emission having a color point within or adjacent the color oval shown in FIG. 3 for conventional deluxe warm-white lamps. Specifically, a high efficiency strontium yellow halophosphate phosphor having the structural formula:

$$Sr_{8.56}Sb_{.035}Mn_{.33}(PO_4)_6 \cdot .93\ SrF_2$$

is blended with europium-activated yttrium oxide in the proportions to provide a desired color point adjacent the black body locus line. Said particular phosphor blend comprised approximately 83 parts of the strontium yellow halophosphate phosphor and 17 parts of the europium-activated yttrium oxide phosphor which resulted in a 100 hour lumen output value of 2,900 lumens when tested in 40-WT12 lamps. The $x$ and $y$ chromaticity values achieved with said mixture were $x = 0.445$ and $y = 0.415$ which corresponded to a color point adjacent the desired color oval.

Another exemplary example in accordance with the present invention is provided to illustrate the results obtained with a particular phosphor combination providing a cool-white deluxe color emission at a higher efficiency than can be obtained with conventional deluxe-type phosphor blends. More particularly, a mixture containing 80 parts of a strontium blue-green halophosphate phosphor coactivated with antimony and manganese having the structural formula:

$$Sr_{8.85}Sb_{.062}Mn_{.05}(PO_4)_6 \cdot .94\ SrF_2$$

and 20 parts europium-activated yttrium oxide phosphor provided composite emission within the standard color oval shown in FIG. 3 for conventional deluxe cool-white lamps. The $x$ and $y$ chromaticity values for said mixture measured $x = 0.374$ and $y = 0.364$ utilizing the same C.I.E. method of measurement. A 40-WT12 type fluorescent lamp using said phosphor blend produced a 100 hour lumen output value of approximately 2,650 lumens along with a 90 color rendering index value.

A still further example for a daylight deluxe fluorescent lamp in accordance with the present invention is provided having a composite emission color point within or adjacent the color oval shown in FIG. 3 for conventional deluxe daylight lamps. Accordingly, 84 parts strontium blue halophosphate phosphor having the structural formula:

$$Sr_{8.88}Sb_{.068}Mn_{.011}(PO_4)_6 \cdot .92\ SrF_2$$

were blended with 16 parts of the europium-activated yttrium oxide phosphor and the 40-WT12 lamps coated with said blend exhibited a 100 hour lumen output value of 2,650 lumens with a 93 C.I.E. color rendering index value. The $x$ and $y$ chromaticity values obtained by the same C.I.E. method of measurement previously employed were $x = 0.313$ and $y = 0.346$.

An explanation of the manner in which the desired emission color point is obtained with the present phosphor combination is also shown in FIG. 3. The straight solid line appearing on said graph represents the color points obtained by compositional variation of the strontiumhaloapatite phosphor within the general range previously given. More particularly, one point illustrated on said straight line is the color point exhibited by the strontium blue halophosphate phosphor herein employed while the second point illustrated on said straight line represents the color point exhibited by the hereinbefore disclosed strontium green halophosphate phosphor. The color point for the europium-activated yttrium oxide phosphor herein employed is also shown on said graph which permits a second straight dash line to be drawn between said color point and the particular point on the solid line representing the color point of the employed halophosphate phosphor. It will be noted for the particular illustration shown wherein the strontium green halophosphate phosphor is blended with said $Y_2O_3$:Eu phosphor that the dash line intersects the standard color oval for conventional deluxe white lamps. Such intersection demonstrates that color points within a particular color oval can be obtained by varying the weight proportion of the component phosphor materials. In like manner, it will be evident that comparable color emission characteristics within the color ovals shown for deluxe warm-white, deluxe cool-white, and deluxe daylight lamps are obtained by varying the weight proportions in the phosphor combination and utilizing other strontiumhaloapatite phosphor materials as hereinbefore disclosed.

Figure 4:
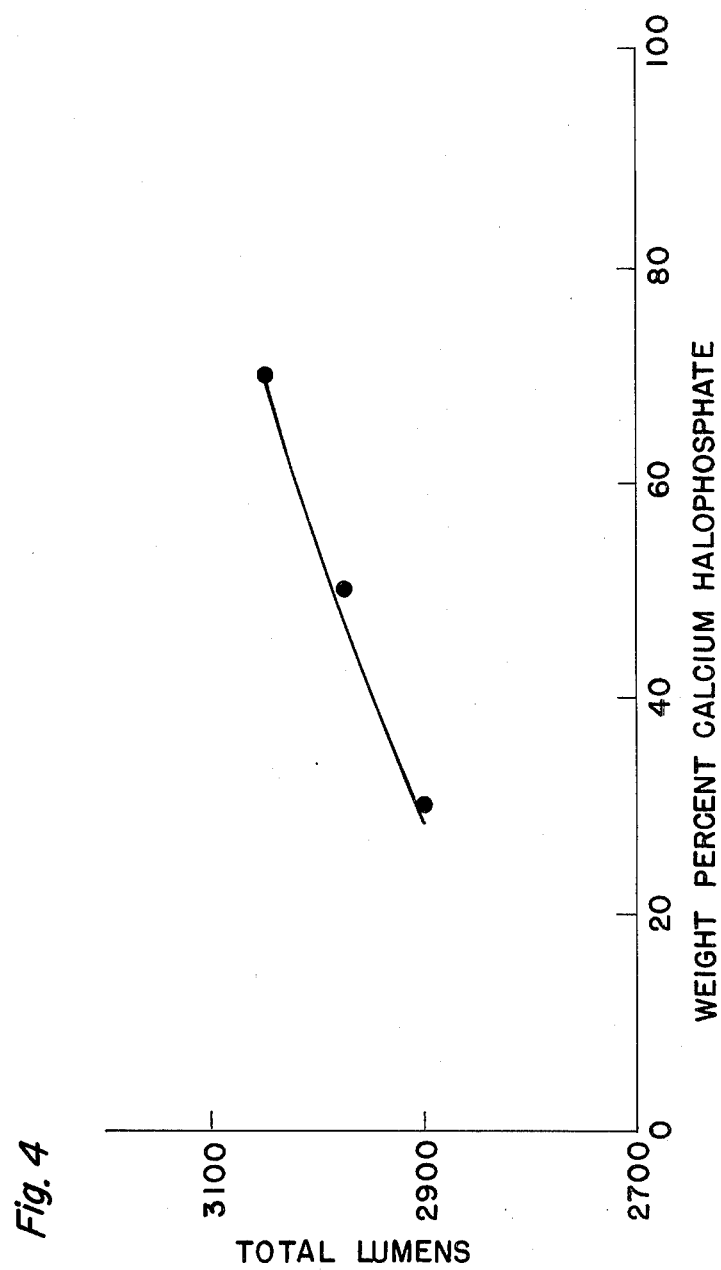
FIG. 4 is a lumen output graph for a different blended phosphor mixture of the present invention.

As previously indicated, comparable lamp performance results are obtained in accordance with the present invention by utilizing the above defined two component phosphor combination with conventional calcium halophosphate phosphors as a blended admixture. Typical ternary phosphor admixtures for a standard white deluxe lamp can have various weight proportions of the $Ca_{8.65}Sb_{.185}Mn_{.252}Cd_{.0972}(PO_4)_6(CaF_2)_{.882}Cl_{.379}$ phosphor blended with a particular phosphor combination of the present invention utilizing 75 parts of the strontium green halophosphate phosphor and 25 parts of the europium-activated yttrium oxide phosphor. Accordingly, a 40-WT12 type fluorescent lamp was constructed utilizing said ternary phosphor mixtures wherein said mixtures contained 30–70 percent by weight of the calcium halophosphate phosphor constituent with the balance consisting of the designated phosphor combination. All of said ternary phosphor mixtures exhibited a color temperature within the applicable color oval shown in FIG. 3 along with color-rendering indices ranging between 66–74 and which can be still acceptable C.I.E. values for deluxe type lamps. The corresponding 0 hour total lumen values measured upon said lamps is shown in FIG. 4. The increased lumen output of said lamps with increasing proportions of the calcium halophosphate constituent as shown is accompanied by decrease in the C.I.E. coloring rendering index values to the extent above specified. It is also expected that comparable results can be obtained for admixtures utilizing the remaining calcium halophosphate phosphor additives previously disclosed. Accordingly, blended phosphor mixtures utilizing the present phosphor combination can contain up to 50 percent or more by weight of said calcium halophosphate phosphor constituents and still provide deluxe color rendition at higher lumen output and reduced cost.

From the above preferred embodiments it is also evident that a particular two component phosphor combination has been provided which achieves significantly more light output than with current deluxe phosphor blends in fluorescent lamps. It will also be apparent, however, that some modification can be made in the illustrated embodiments by compositional variation of the phosphor constituents without departing from the true spirit and scope of this invention. For example, it is already known to incorporate cadmium as well as other modifying metal ions in the particular strontium halophosphate phosphors above illustrated without appreciable influence upon the otherwise desired emission response. Consequently, it is intended to limit the present invention only by the scope of the appended claims.

What we claim as new and desire to secure by Letters Patent of the United States is:

1. In a fluorescent lamp which includes a tubular shaped lamp glass envelope, an electrode structure at each end of said glass envelope, a mercury and inert gas filling within said envelope, and a phosphor coating on the interior surface of said glass envelope, the improvement which comprises using a blended phosphor mixture comprising a phosphor combination of a strontium haloapatite phosphor having the general formula:

$$Sr_{10-x-y}Sb_xMn_y(PO_4) \cdot A_2$$

wherein A is a halide ion selected from F and Cl including combinations thereof, $x$ is in the approximate range 0.04–0.15, and $y$ is in the approximate range 0.01–0.42 with europium-activated yttrium oxide phosphor, which phosphor combination produces a composite emission at a color temperature in the approximate range 2,700° K – 6,500° K with satisfactory color rendition and a higher luminous efficiency than is obtained with conventional deluxe phosphor blends, wherein the weight ratios for said phosphor combination is approximately 68–85 weight percent of the strontium haloapatite phosphor and approximately 32–15 weight percent of the europium-activated yttrium oxide phosphor.

2. A lamp as in claim 1 wherein the blended phosphor mixture is in parts by weight approximately 80 parts strontium green halophosphate phosphor with approximately 20 parts europium-activated yttrium oxide phosphor.

3. A lamp as in claim 1 wherein the blended phosphor mixture is in parts by weight approximately 83 parts strontium yellow halophosphate phosphor with approximately 17 parts europium-activated yttrium oxide phosphor.

4. A lamp as in claim 1 wherein the blended phosphor mixture is in parts by weight approximately 80 parts stontium blue-green halophosphate phosphor with approximately 20 parts europium-activated yttrium oxide phosphor.

5. A lamp as in claim 1 wherein the blended phosphor mixture is in parts by weight approximately 84 parts strontium blue halophosphate phosphor with approximately 16 parts europium-activated yttrium oxide phosphor.

6. A lamp as in claim 1 wherein the blended mixture further contains a different phosphor having a visible emission response similar to the composite emission response of said phosphor combination.

* * * * *

UNITED STATES PATENT OFFICE
CERTIFICATE OF CORRECTION

PATENT NO. : 4,079,287
DATED : March 14, 1978
INVENTOR(S) : Thomas F. Soules and Thomas E. Offerle It is certified that error appears in the above-identified patent and that said Letters Patent are hereby corrected as shown below:

In column 7, claim 1, line 9, in said claim, change formula "$Sr_{10-x-y} Sb_x Mn_y (PO_4) \cdot A_2$" to read --$Sr_{10-x-y} Sb_x Mn_y (PO_4)_6 \cdot A_2$--.

Signed and Sealed this

Eleventh Day of July 1978

[SEAL]

Attest:

RUTH C. MASON
Attesting Officer

DONALD W. BANNER
Commissioner of Patents and Trademarks